G. E. & E. W. Watson,
Water Wheel,

Nº 38,707. Patented May 26, 1863.

Witnesses:
Chas Foster
L. D. Garrison

Inventors:
George E Watson
Elijah W Watson

UNITED STATES PATENT OFFICE.

GEORGE E. WATSON AND ELIJAH W. WATSON, OF McLEAN, NEW YORK.

IMPROVEMENT IN WATER-WHEELS.

Specification forming part of Letters Patent No. 38,707, dated May 26, 1863.

*To all whom it may concern:*

Be it known that we, GEORGE E. WATSON and ELIJAH W. WATSON, of McLean, in the county of Tompkins and State of New York, have invented a new and useful Improvement in Water-Wheels; and we do hereby declare that the following is a full, clear, and exact description of the construction and operation of the same, reference being had to the annexed drawings, making a part of this specification, in which—

Figure 2:
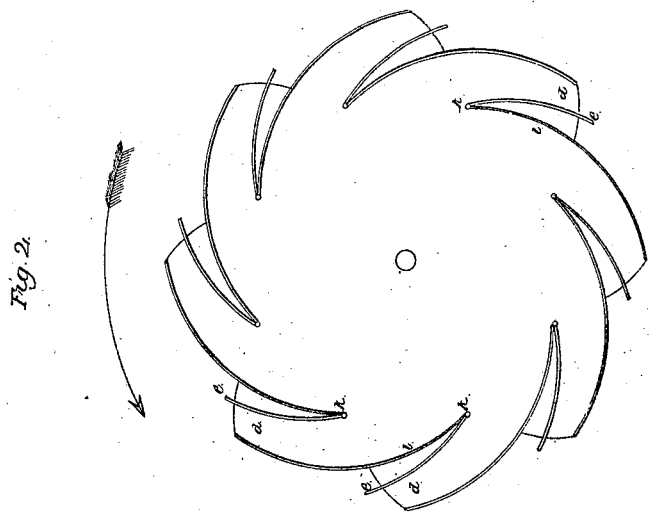
Figure 1:
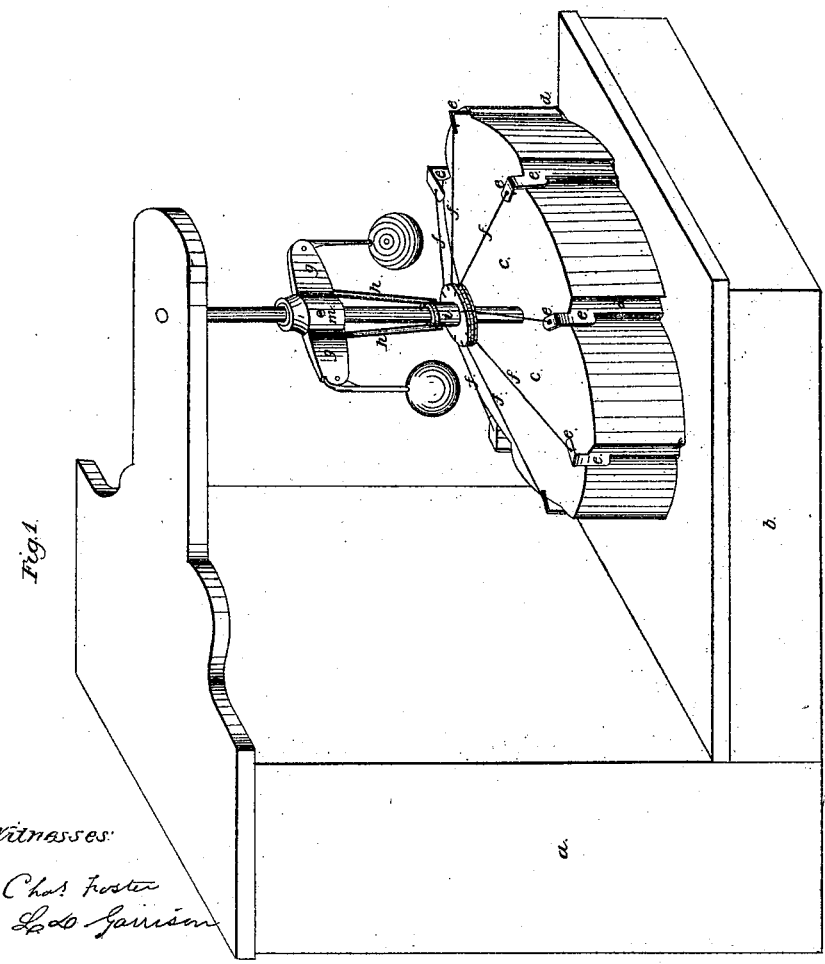

Figure 1 is a perspective view, and Fig. 2 is a section in the direction $y\ y$, like letters referring to like parts.

$a$ represents the bulk head, with an extension or trunk, $b$, upon which the wheel $c$ revolves, supported by a step in a rim projecting from said trunk, and upon which rim a corresponding rim in the wheel closely fits, the water coming into the wheel from underneath. The issues of the wheel are vertical, $d\ d$, and on the periphery of the wheel. At the inner ends of the buckets, at the point $k\ k$, are hinged perpendicular curved swing-buckets $e\ e$, extending outward to and made to open and close at the point of discharge.

$i$ is a sliding collar upon the shaft of the wheel, connected with the outer ends of the swing-buckets by the rods $f\ f$, and as said collar is moved up or down upon the shaft the said buckets must move in or out, and thus increase or decrease the dimensions of the issues of the wheel.

$g\ g$ is a governor upon the shaft of the wheel, acting by the rods $h\ h$ upon the collar $i$, and thus directly operating the swing-buckets $e\ e$, and controlling the speed of the wheel by controlling the issues $d\ d$, as by any increase of the velocity of the wheel the arms of the governor are thrown upward and outward, the collar is pressed down, and it in turn forcing outward the ends of the buckets the discharge of the water is thus decreased, and, of course, the power and velocity of the wheel are reduced proportionably. The governor may be raised or lowered on the shaft by means of the set-screw $m$, adjusted to the use of the proper amount of water.

The advantages of this improvement consist, first, in the economical use of water, no more being used than is wanted, and none is wasted; second, by admitting a full supply into the wheel, and thus maintaining a constant pressure equal to the pressure on the bulk-head, the full power of all the water escaping is obtained; and, third, what is particularly desirable, the governor acts directly and instantaneously upon the issues or seat of power in increasing or decreasing the amount of water discharged.

We are aware that various devices have been used to regulate the amount of water to be used in water-wheels, and thus regulating the power or speed of the wheel; but they are all for the purpose of regulating the flow of water to the wheel, cutting off or letting on, increasing or diminishing the volume, while our improvement operates, not in keeping back the water from the wheel or regulating its flow to it, but solely in controlling and regulating its escape from the wheel, thus regulating its speed, and at all times, whether little or much water is used, obtaining its full power by using its full pressure.

We are aware, also, that governors have been used in connection with water-wheels to govern their speed by operating gates in the bulkhead or flume; but their action is indirect and circuitous, and requires time to affect the speed of the wheel.

The power of a wheel under a given head is nearly proportioned to the size of the issues, or the amount of water it can effectively let pass. We apply our regulator directly to these issues, keeping the column of water unbroken before or above the wheel, and its pressure at all times the same.

What we claim, and desire to secure by Letters Patent, is—

1. The swing-buckets $e\ e$, in combination with the rods $f\ f$, collar $i$, and governor $g\ g$.

2. The operating said collar $i$ and buckets $e\ e$, when the wheel is in motion, directly by means of a governor upon the shaft of the wheel.

GEORGE E. WATSON.
ELIJAH W. WATSON.

Witnesses:
C. FOSTER,
O. H. REYNOLDS.